(12) United States Patent
Berendes

(10) Patent No.: US 12,362,624 B2
(45) Date of Patent: Jul. 15, 2025

(54) ELECTRIC MACHINE WITH SLEEVE-LIKE WALL SEALING ARRANGEMENT, AND ELECTRIC VEHICLE

(71) Applicant: Dr. Ing. h.c. F. Porsche Aktiengesellschaft, Stuttgart (DE)

(72) Inventor: Philipp Berendes, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 330 days.

(21) Appl. No.: 17/880,674

(22) Filed: Aug. 4, 2022

(65) Prior Publication Data
US 2023/0050731 A1   Feb. 16, 2023

(30) Foreign Application Priority Data

Aug. 12, 2021   (DE) ...................... 10 2021 120 993.5

(51) Int. Cl.
| | |
|---|---|
| *H02K 5/10* | (2006.01) |
| *H02K 5/128* | (2006.01) |
| *H02K 7/14* | (2006.01) |
| *H02K 9/197* | (2006.01) |

(52) U.S. Cl.
CPC .............. *H02K 5/10* (2013.01); *H02K 5/128* (2013.01); *H02K 7/14* (2013.01); *H02K 9/197* (2013.01)

(58) Field of Classification Search
CPC ........... H02K 9/197; H02K 5/10; H02K 5/128
USPC ........................................................... 310/86
See application file for complete search history.

(56) References Cited

U.S. PATENT DOCUMENTS

| | | | | |
|---|---|---|---|---|
| 1,678,380 A | * | 7/1928 | Lancelot ................ | H02K 5/128 310/86 |
| 2,428,236 A | * | 9/1947 | Maxwell ................ | H02K 5/128 310/86 |
| 2,517,233 A | * | 8/1950 | Peters ................... | F04D 13/064 310/90 |

(Continued)

FOREIGN PATENT DOCUMENTS

| | | | | |
|---|---|---|---|---|
| CN | 112671124 A | * | 4/2021 | ............... H02K 1/20 |
| DE | 4023756 C1 | * | 12/1991 | ............. H02K 5/124 |

(Continued)

OTHER PUBLICATIONS

Translation of JP 2008195954 A (Year: 2008).*
Translation of JP 5555510 B2 (Year: 2014).*

*Primary Examiner* — Oluseye Iwarere
*Assistant Examiner* — Daniel K Schlak
(74) *Attorney, Agent, or Firm* — LEYDIG, VOIT & MAYER, LTD.

(57) ABSTRACT

An electric machine, including a housing, a rotor which includes a rotor shaft and a rotor laminated core, a directly cooled stator which includes a stator laminated core, an annular gap configured between the rotor laminated core and the stator laminated core, and a sleeve-like wall element disposed in the annular gap, wherein the wall element abuts the stator with its outer surface and seals the stator against the rotor, wherein the housing is configured in a pot-like manner such that it is permanently or tightly closed on a first axial side by a bottom wall at least radially overlapping the stator and is open on an opposite second axial side and can be closed there via a lid, and a seal is disposed in a region of each axial end or each axial side of the wall element.

13 Claims, 3 Drawing Sheets

(56) References Cited

U.S. PATENT DOCUMENTS

| | | | | |
|---|---|---|---|---|
| 2,734,459 A * | 2/1956 | Zimsky | H02K 5/128 | 417/357 |
| 2,809,310 A * | 10/1957 | Dunn | H02K 5/1285 | 310/86 |
| 2,887,062 A * | 5/1959 | Cametti | F04D 29/5806 | 417/423.14 |
| 2,911,918 A * | 11/1959 | Reed | H02K 9/24 | 417/370 |
| 2,942,555 A * | 6/1960 | Pezzillo | F04D 13/062 | 310/90 |
| 2,967,960 A * | 1/1961 | Waldschmidt | H02K 5/1285 | 310/43 |
| 2,972,308 A * | 2/1961 | Haggerty | F02M 37/10 | 417/357 |
| 2,994,795 A * | 8/1961 | Cattabiani | H02K 5/128 | 310/85 |
| 2,996,632 A * | 8/1961 | Ward, Jr. | H02K 5/128 | 310/86 |
| 3,013,500 A * | 12/1961 | Bollibon | F04D 29/588 | 417/373 |
| 3,135,211 A * | 6/1964 | Pezzillo | F04D 13/0613 | 417/357 |
| 3,135,884 A * | 6/1964 | Luenberger | H02K 5/1285 | 310/87 |
| 3,209,183 A * | 9/1965 | Bollibon | H02K 5/128 | 310/90 |
| 3,231,768 A * | 1/1966 | Dannenmann | H02K 5/128 | 310/86 |
| 3,361,916 A * | 1/1968 | Guinard | H02K 5/1285 | 310/86 |
| 3,444,403 A * | 5/1969 | Macha | H02K 5/1285 | 310/86 |
| 3,450,056 A * | 6/1969 | Stark | F04D 29/588 | 417/423.12 |
| 3,609,420 A * | 9/1971 | Inagaki | H02K 19/103 | 310/86 |
| 3,667,870 A * | 6/1972 | Zinsky | F04D 13/0646 | 417/357 |
| 3,727,085 A * | 4/1973 | Goetz | H02K 5/128 | 174/DIG. 20 |
| 5,129,795 A * | 7/1992 | Hyland | H02K 7/09 | 417/423.12 |
| 5,519,269 A * | 5/1996 | Lindberg | H02K 9/197 | 310/58 |
| 5,785,013 A * | 7/1998 | Sinn | F04D 13/0613 | 417/366 |
| 8,083,500 B1 * | 12/2011 | Lebkuchner | H02K 5/128 | 417/423.15 |
| 8,558,422 B2 | 10/2013 | Baumann et al. | | |
| 2003/0127924 A1* | 7/2003 | Van Dine | H02K 5/128 | 310/87 |
| 2013/0177405 A1* | 7/2013 | Legros | H02K 5/128 | 415/173.7 |
| 2014/0001901 A1* | 1/2014 | Finney | H02K 5/128 | 310/88 |
| 2014/0054992 A1* | 2/2014 | Hasegawa | H02K 5/128 | 310/86 |
| 2014/0139061 A1* | 5/2014 | Gutjahr | H02K 9/197 | 310/86 |
| 2018/0226855 A1* | 8/2018 | Berendes | H02K 3/34 | |
| 2020/0007000 A1* | 1/2020 | Berendes | H02K 5/128 | |
| 2020/0274416 A1* | 8/2020 | Wrighton | H02K 5/132 | |
| 2022/0052576 A1* | 2/2022 | Knoblauch | H02K 5/10 | |
| 2022/0123615 A1* | 4/2022 | Masfaraud | H02K 3/24 | |
| 2022/0186686 A1* | 6/2022 | Honda | H02K 9/08 | |
| 2022/0393552 A1* | 12/2022 | Berendes | H02K 5/128 | |
| 2024/0014710 A1* | 1/2024 | Rustichelli | H02K 7/003 | |

FOREIGN PATENT DOCUMENTS

| | | | |
|---|---|---|---|
| DE | 202010018078 U1 | 1/2014 | |
| DE | 102013216312 A1 * | 2/2015 | H02K 5/128 |
| DE | 102019117373 A1 * | 12/2020 | H02K 9/197 |
| DE | 102019120824 A1 * | 2/2021 | H02K 5/128 |
| DE | 102020106798 A1 * | 9/2021 | H02K 5/128 |
| EP | 1271747 A1 | 1/2003 | |
| EP | 1437819 B1 | 7/2004 | |
| EP | 2400639 A2 * | 12/2011 | H02K 5/128 |
| GB | 2509738 A * | 7/2014 | H02K 3/487 |
| GB | 2500040 B | 7/2018 | |
| JP | 4023756 C1 * | 12/1991 | H02K 5/124 |
| JP | 2008094225 A | 4/2008 | |
| JP | 2008175090 A * | 7/2008 | F04D 29/58 |
| JP | 2008195954 A * | 8/2008 | C10M 135/20 |
| JP | 5555510 B2 * | 7/2014 | H02K 5/128 |
| WO | WO-2023232230 A1 * | 12/2023 | F04D 13/0626 |

* cited by examiner

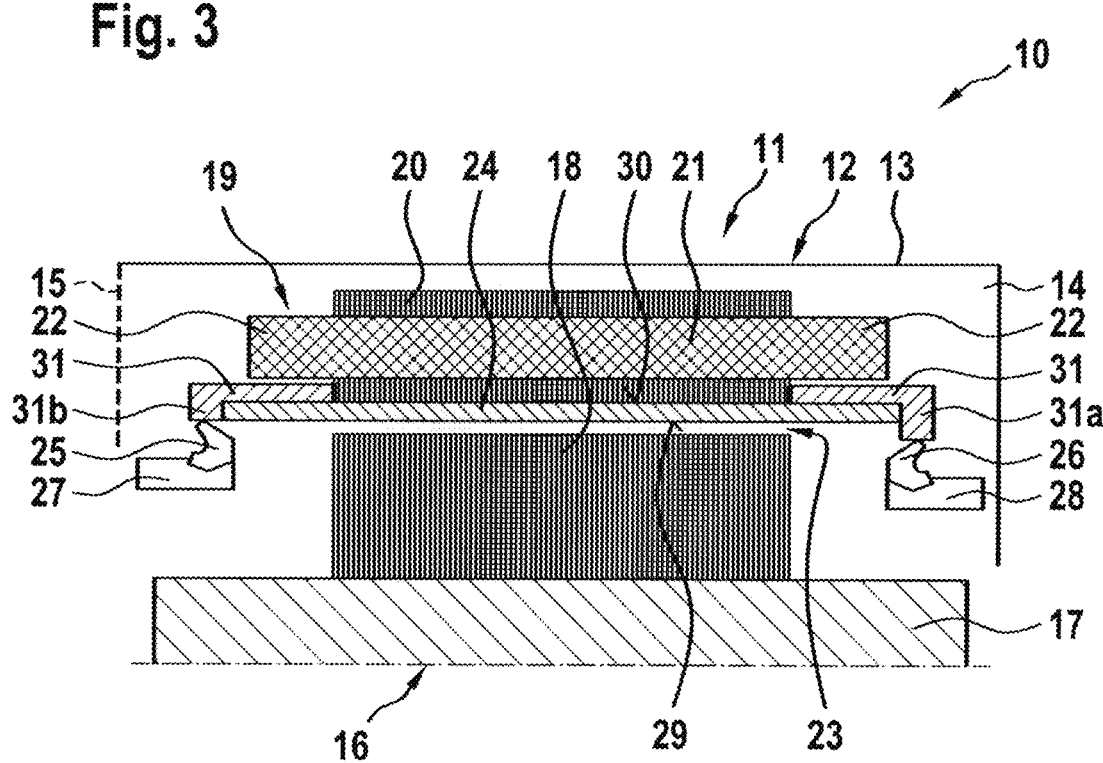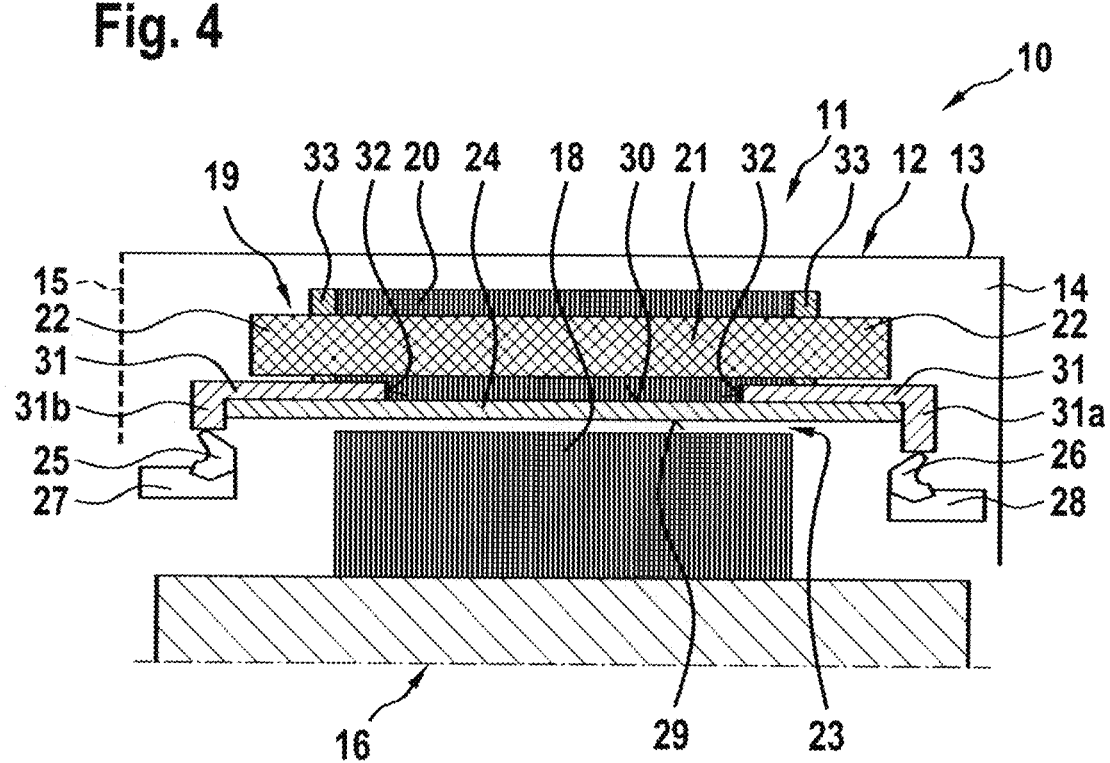

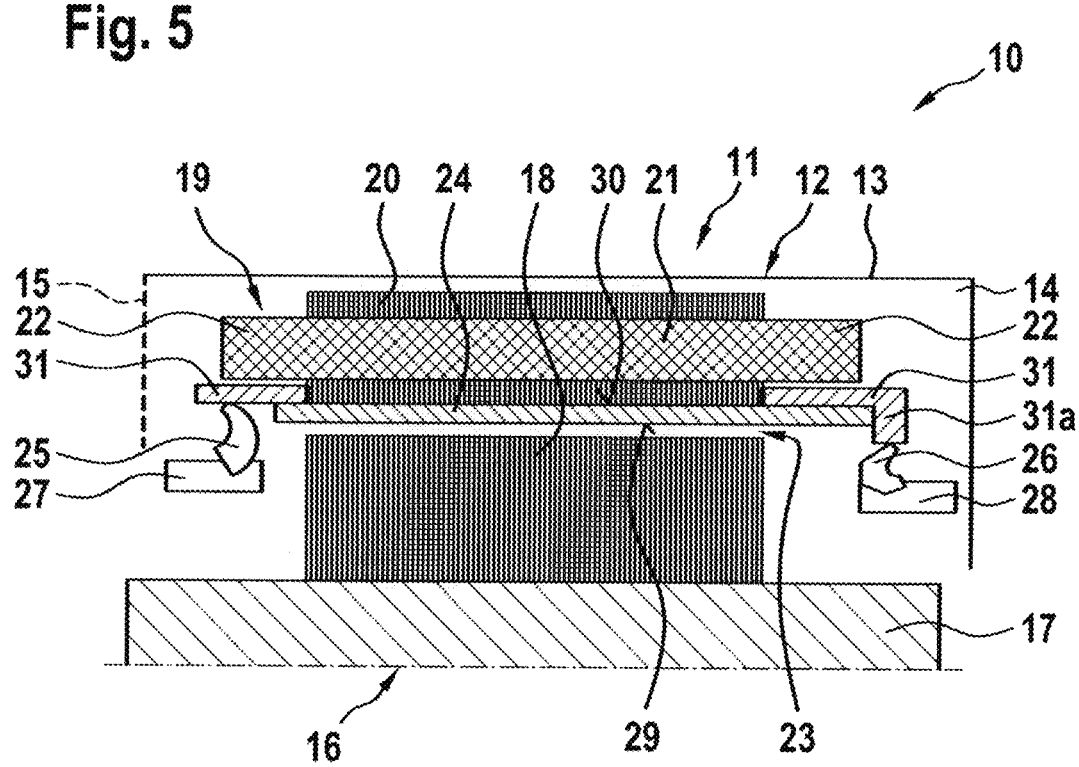

ELECTRIC MACHINE WITH SLEEVE-LIKE WALL SEALING ARRANGEMENT, AND ELECTRIC VEHICLE

CROSS REFERENCE TO RELATED APPLICATIONS

This application claims benefit to German Patent Application No. DE 10 2021 120 993.5, filed on Aug. 12, 2021, which is hereby incorporated by reference herein.

FIELD

The invention relates to an electric machine. The invention also relates to a motor vehicle.

BACKGROUND

The basic design of an electric machine is known from practice. An electric machine has a housing and a stator, which comprises a stator laminated core and a coil device with winding heads. The stator is also referred to as the stand. An electric machine also has a rotor, which comprises a rotor shaft and a rotor laminated core. The rotor is also referred to as the runner. The rotor is rotatably mounted in the housing.

An electric machine having a housing, a stator and a rotor is known from U.S. Pat. No. 8,558,422 B2. The rotor comprises a shaft and a rotor laminated core. The rotor is rotatably mounted in the housing via bearings, wherein the housing comprises a tubular base body which is open on both sides and can be closed on both sides via a respective lid. Oil can be fed to the stator via nozzles for direct cooling of the stator. A spacer ring which engages on the stator seals the stator against the rotor, so that the oil used for cooling does reach the rotor.

EP 1 271 747 A1 discloses another electric machine comprising a housing, a rotor and a stator. The housing again comprises a tubular base body which can be closed on both sides by a lid. The stator is again directly cooled with coolant, wherein the rotor is sealed against the stator by a sleeve-like element which prevents the coolant used for direct cooling of the stator from reaching the region of the rotor.

EP 1 437 819 B1 and GB 2 500 040 B disclose further electric machines.

There is a need for an electric machine that preferably serves as a drive assembly for a motor vehicle and comprises effective fluid-tight sealing of a directly cooled stator against the rotor.

SUMMARY

In an embodiment, the present disclosure provides an electric machine, comprising a housing, a rotor which comprises a rotor shaft and a rotor laminated core, a directly cooled stator which comprises a stator laminated core, an annular gap configured between the rotor laminated core and the stator laminated core, and a sleeve-like wall element disposed in the annular gap, wherein the wall element abuts the stator with its outer surface and seals the stator against the rotor such that no coolant reaches the rotor via the annular gap from the stator, wherein the housing is configured in a pot-like manner such that it is permanently or tightly closed on a first axial side by a bottom wall at least radially overlapping the stator and is open on an opposite second axial side and can be closed there via a lid, a seal is disposed in a region of each axial end or each axial side of the wall element, and the seal that is disposed adjacent to the first axial side of the housing has a smaller sealing radius than the seal that is disposed adjacent to the second axial side of the housing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 shows a section of an electric machine according to the invention with a support ring having two projections;

FIG. 4 shows a section of an electric machine according to the invention with a support ring that is lengthened in an axial direction; and FIG. 5 shows a section of an electric machine according to the invention with a support ring that projects in an axial direction relative to a sleeve-like wall element.

DETAILED DESCRIPTION

Figure 1:
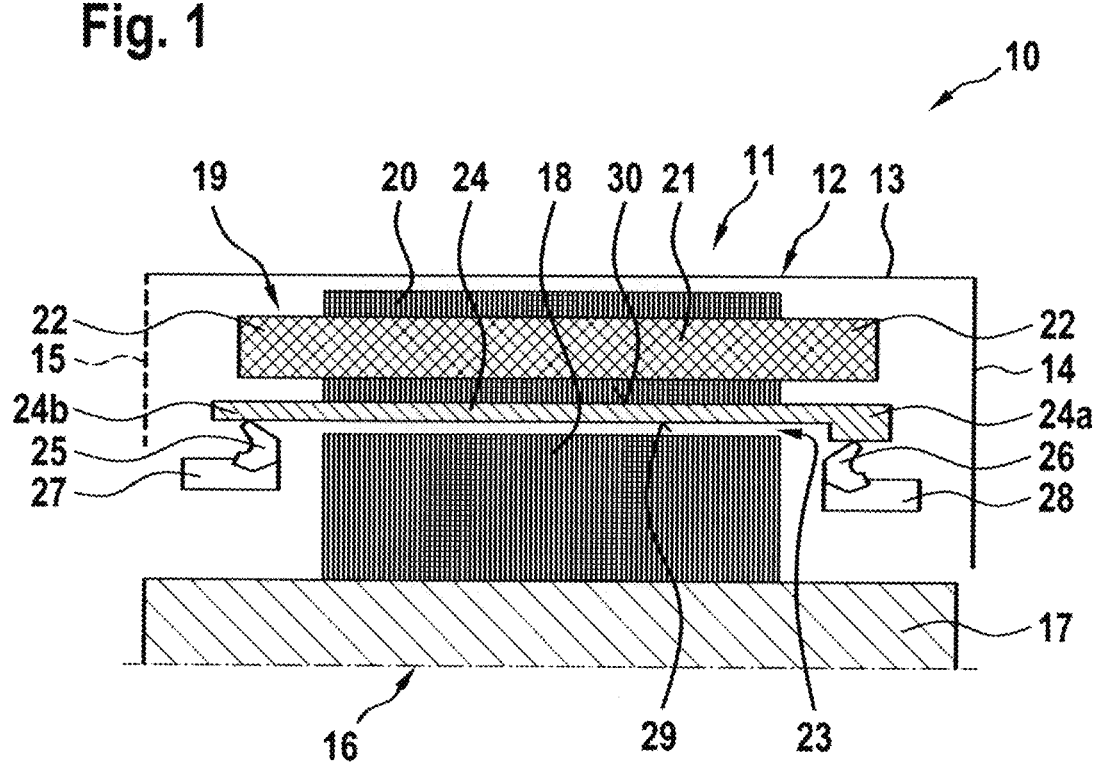
FIG. 1 shows a section of an electric machine according to the invention with a sleeve-like wall element.

In an embodiment, the present disclosure provides a novel electric machine and a motor vehicle.

According to an embodiment, the housing is configured in a pot-like manner such that it is permanently or tightly closed on a first axial side by a bottom wall at least radially overlapping the stator and is open on an opposite second axial side and can be closed there via a lid.

A seal for axially sealing the annular gap and thus the rotor is disposed in the region of each axial end or each axial side of the wall element. The seal that is disposed adjacent to the first axial side of the housing has a smaller sealing radius than the seal that is disposed adjacent to the second axial side of the housing.

In the electric machine according to an embodiment of the invention, the housing is configured in a pot-like manner. Said housing is permanently or tightly closed on a first axial side by a bottom wall at least radially overlapping the stator. The housing is open only on a second axial side opposite to this first axial side and can be closed there via a separate, removable lid. The bottom wall and lid typically comprise a recess for the passage of the rotor shaft or a bearing of the rotor shaft. The lid is also referred to as a bearing shield.

Seals which are disposed at the opposite axial ends or opposite axial sides of the sleeve-like wall element adjacent to the two axial sides of the housing have different sealing radii, wherein the seal that is disposed adjacent to the first axial side of the housing that is permanently or tightly closed by the bottom wall has a smaller sealing radius than the seal that is disposed adjacent to the second axial side of the housing which can be closed by the lid.

It is thus possible to utilize the advantage of a housing that is closed only on a first axial side via a lid and at the same time ensure that the seal that is disposed adjacent to the first axial side of the housing is not damaged during assembly when the seals are being mounted. There is no risk of this seal coming into contact with the sleeve-like wall element, scraping against said element or being damaged by uneven areas or dirt during assembly. In an embodiment, the invention provides an electric machine that preferably serves as a drive assembly for a motor vehicle and comprises effective fluid-tight sealing of a directly cooled stator against the rotor.

According to an embodiment of the invention, at the axial end or the axial side which is disposed adjacent to the first axial side of the housing, the wall element comprises a radially inwardly offset projection having a reduced inner diameter, wherein the seal that is disposed adjacent to the first axial side of the housing seals against the projection of the wall element having the reduced inner diameter, and wherein the seal that is disposed adjacent to the second axial side of the housing seals against a portion of the wall element which has a larger inner diameter than the projection.

According to an embodiment of the invention, the wall element is preferably a can. Such a can may be glued to the stator or connected to the stator in a form-locking manner. The radially inwardly offset projection having the reduced inner diameter is configured on the wall element directly adjacent to the first axial side of the housing. The seal that is disposed adjacent to the first axial side of the housing seals against this projection.

According to an embodiment of the invention, the wall element is supported radially on the outside at both axial ends or both axial sides by a support ring, wherein the respective support ring surrounds the wall element at the axial end or the axial side which is disposed adjacent to the first axial side of the housing with a projection in such a way that the projection of the support ring has a smaller inner diameter than the wall element, and wherein the seal that is disposed adjacent to the first axial side of the housing seals against the projection of the support ring.

According to an embodiment of the invention, the wall element is preferably a liner, for example a liner made of a fiber-resin laminate or also a cast liner, such as an injection-molded liner. The cast liner can also be configured by means of transfer molding. A liner is preferably fixedly connected to the stator. In this case, a support ring which supports the wall element radially on the outside then forms the projection having the smaller inner diameter at the axial end or the axial side of the wall element that is disposed adjacent to the first axial side of the housing, wherein the seal that is disposed adjacent to the first axial side of the housing then seals against this projection.

FIG. 1 shows a schematic cross-section through an electric machine 10 according to an embodiment of the invention. The electric machine 10 comprises a housing 11, which is configured in a pot-like manner.

A base body 12 of the pot-like housing 11 comprises a tubular wall 13, which is tightly or permanently closed on a first axial side of the housing 11 by a side wall 14 at least radially overlapping the stator. This side wall 14 can also be referred to as a bottom wall.

On an opposite second axial side, the pot-like housing 11, i.e., the base body 12, is open and can be closed there by a separate, removable lid 15.

The electric machine 10 further comprises a rotor 16 consisting of a rotor shaft 17 and a rotor laminated core 18 held by the rotor shaft 17. The rotor, i.e., the rotor shaft 17, is rotatably mounted in the housing 11 and the lid 15 via not depicted bearings.

The side wall or bottom wall 14 of the housing 11 and the lid 15 typically comprise recesses for the passage of the rotor shaft 17 or bearings of the rotor shaft 17. The lid 15 is also referred to as a bearing shield.

The electric machine 10 further comprises a stator 19. The stator 19 comprises a stator laminated core 20 and electrical conductors 21 which extend across it through the stator laminated core 20 and project relative to the stator laminated core 20 at both axial ends thereof to form winding heads 22 there. The stator 19 is a directly cooled stator, wherein a dielectric coolant, such as oil, flows directly around at least the winding heads 22, preferably all of the conductors 21, for cooling.

An annular gap 23, in which a sleeve-like wall element 24 is disposed, is configured between the rotor 16, i.e., the rotor laminated core 18, and the stator 19, i.e., the stator laminated core 20. In the region of the annular gap 23, the sleeve-like wall element 24 seals the stator 19 against the rotor 16 such that no coolant can reach the rotor 16 via the annular gap 23 from the directly cooled stator 19.

A seal 25, 26, which serves to further seal the rotor 16, is disposed in the region of each axial end or each axial side of the sleeve-like wall element 24. Each one of these seals 25, 26 is held by a seal carrier 27, 28, wherein the seal carrier 28 is preferably fixed to the housing and the seal carrier 27 is preferably fixed to the lid.

As already stated, the housing 11 is configured in a pot-like manner, i.e., closed in the region of the first axial side by the side wall or bottom wall 14 and open only on the opposite second side and closed there by a separate lid 15.

When assembling the electric machine 10, the stator 19 is disposed in the housing 11 first, after which the seals 25, 26 are disposed. The seal 26, which is disposed adjacent to the first axial side of the housing 11 closed by the side wall or bottom wall 14, has to then be guided past the sleeve-like wall element 24 over the entire axial extent.

In order to be able to prevent the seal 26, which is disposed adjacent to the first axial side of the housing 11 closed by the side wall or bottom wall 14, from coming into contact with an inner surface 29 of the sleeve-like wall element 24 and being damaged, for example by uneven areas of said wall element or dirt, when it is being mounted, it is proposed according to an embodiment of the invention that the seal 26 that is disposed adjacent to the first axial side of the housing 11 permanently or tightly closed by the side wall or bottom wall 14 has a smaller outer radius and thus sealing radius than the seal 25 that is disposed adjacent to the opposite second axial side of the housing 11 and further seals the rotor 16 there.

In the design example of FIG. 1, the sleeve-like wall element 24 is preferably a can, which abuts an outer surface 30 on the stator, i.e., on the stator laminated core 20, and can be connected to said stator by gluing, for example, or also in a form-locking manner. Such a can is inherently stable and does not have to be connected to the stator laminated core 20. Such a can may be placed into the stator.

Adjacent to the first axial side of the housing 11 that is permanently or tightly closed by the bottom wall 14, the wall element 24 that is preferably configured as a can comprises a radially inwardly offset projection 24a which has a reduced inner diameter compared to the rest of the wall element 24 that is preferably configured as a can. The inner diameter of the inner surface 29 of the wall element 24 that is preferably configured as a can is thus reduced in the region of the projection 24a.

The seal 26 that is disposed adjacent to the first axial side of the housing 11, i.e., adjacent to the bottom wall 14, seals against this projection 24a of the wall element 24 that is preferably configured as a can, i.e., against the inner surface of said projection 24a. The seal 25 that is disposed adjacent to the second axial side of the housing 11, i.e., adjacent to the lid 15, on the other hand, seals against a portion 24b of the inner surface of the wall element 24 preferably configured as a can, which projects from the annular gap 23 on this second axial side and has a larger inner diameter than the projection 24a on the opposite axial side of the stator 19.

The seal 26 that is disposed adjacent to the first axial side of the housing 11 therefore has a smaller outer radius and thus sealing radius than the seal 25 that is disposed adjacent to the second axial side of the housing 11.

It is possible that the portion 24b of the inner surface of the wall element 24 which is preferably configured as a can in FIG. 1 and on which the seal 25 seals, has a larger inner diameter than the portion of the inner surface 29 of the wall element 24 extending in the region of the annular gap 23.

Figure 2:
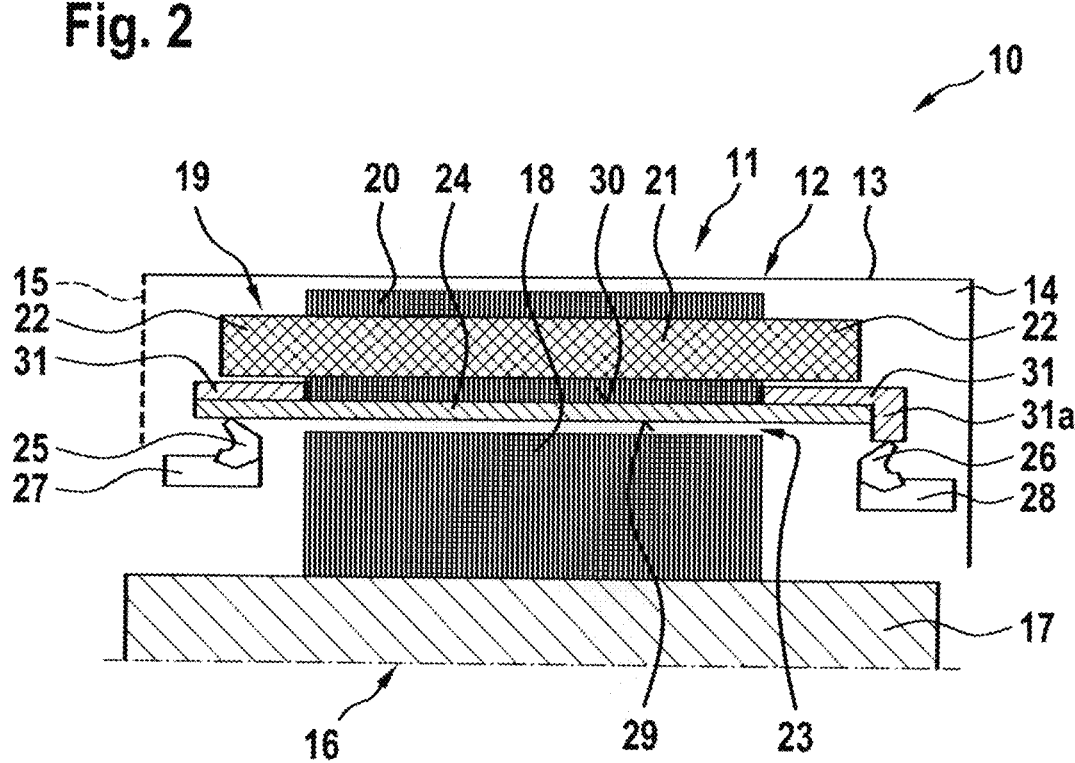
FIG. 2 shows a section of an electric machine according to the invention with a support ring having one projection.

FIG. 2 shows a variant of the electric machine 10 of an embodiment of the invention that differs from the electric machine 10 of FIG. 1 in particular by the design of the sleeve-like wall element 24. Whereas the sleeve-like wall element 24 in FIG. 1 is preferably formed by a can, in FIG. 2 the sleeve-like wall element 24 is preferably formed by a liner which is supported radially on the outside at both axial ends or both axial sides by a support ring 31. In such a wall element 24 configured as a liner, the liner can be made of a fiber-resin laminate or can also be a cast liner, such as an injection-molded liner, which is preferably fixedly connected to the stator 19, i.e., the stator laminated core 20.

In FIG. 2, the support ring 31, which is disposed adjacent to the first axial side of the housing 11 that is permanently or tightly closed by the bottom wall 14, forms a projection 31a that is lengthened radially inward relative to the wall element 24 which is configured as a liner in FIG. 2. Therefore, in FIG. 2, the support ring 31 surrounds the wall element 24 configured as a liner adjacent to the first axial side of the housing 11, wherein the projection 31a of the support ring 31 comprises an inner surface which has a smaller inner diameter than the liner 24. The seal 26 that is disposed adjacent to the first axial side of the housing 11, seals against this projection 31a of the support ring 31, i.e., against the inner surface thereof, in order to ultimately seal the rotor 16 axially. On the opposite second axial side of the housing 11, the seal 25 located there seals against the inner surface 29 of the wall element 24 configured as a liner on a larger sealing radius.

According to FIG. 5, the support ring 31, which is disposed on the second axial side of the housing 11, can project in axial direction relative to the wall element 24 configured as a liner. The seal 25 located there then seals against the inner surface of the corresponding support ring 31. In FIG. 5, neither the support ring 31 nor the wall element 24 exhibit a change in diameter on the second axial side of the housing 11.

FIG. 3 shows an electric machine 10 as a modification of the electric machine 10 of FIG. 2, wherein the support ring 31 located on the second axial side of the housing 11 in FIG. 3 also comprises a projection 31b which surrounds the wall element 24, preferably configured as a liner, but wherein said projection 31b on the second axial side or the second axial end of the wall element 24 preferably configured as a liner has the same inner diameter as the liner 24. In FIG. 3, the seal 25 located adjacent to the second axial side of the housing 11 then seals against the inner surface of this projection 31b of the support ring 31. The seal 25 located adjacent to the second axial side of the housing 11 can alternatively also seal against the inner surface of the wall element 24.

FIG. 4 shows a further modification of the electric machine 10 of FIG. 2, wherein, in FIG. 4, the support ring 31 located on the second axial side of the housing 11 for the wall element 24 preferably configured as a liner is likewise lengthened radially inward relative to the wall element 24 preferably configured as a liner, but to a lesser extent than on the first axial side of the housing 11. Therefore, for the design example of FIG. 4 it likewise holds true that the seal 26 located adjacent to the first axial side of the housing 11 has a smaller outer radius and thus sealing radius than the seal 25 located adjacent to the second axial side of the housing 11. In FIG. 4, the seal 25 located adjacent to the second axial side of the housing 11 seals against the inner surface of said projection 31b.

The electric machine 10 of FIG. 4 further differs from the electric machines of FIGS. 2 and 3 in that the respective support ring 31 is lengthened in axial direction toward the stator laminated core 20 and projects into a corresponding recess 32 in the stator laminated core 20 of the stator 19. Support rings 31 configured in this way can be used in FIGS. 2 and 3 as well.

FIG. 4 further shows that an end plate 33 can be disposed at each of the two axial ends of the stator laminated core 20. Such end plates 33 secure the electrical conductors 21 that extend through grooves in the stator laminated core 20. These end plates 33 are used in particular when coolant flows directly around the conductors 21 in the grooves of the stator laminated core 20 and said conductors can therefore not be held in the grooves in an adequately secure manner. The end plates 33 can be an integral part of the respective support ring 31 or can be configured as separate assemblies.

For the assembly of the electric machines 10 shown in FIGS. 1 to 4, the pot-like housing 11 is provided first and then the stator 19 is disposed in the pot-like housing 11 starting from the second axial side of the housing 11, preferably together with the respective sleeve-like wall element 24. Only then is the seal 26, which axially seals the rotor 16 adjacent to the first axial side of the housing 11, inserted into the housing 11 starting from the second axial side of the housing 11. Since the outer radius and thus the sealing radius of this seal 26 is smaller than the inner radius of the inner surface 29 of the sleeve-like wall element 24 in the region of the second axial side or the second axial end thereof and smaller than the inner radius of the inner surface 29 of the sleeve-like wall element 24 in the region of the annular gap 23, there is no risk that the seal 26 will scrape along the inner surface 29 of the sleeve-like wall element 24 when it is being mounted and then be damaged, for example by uneven areas or dirt.

After this seal 26 is disposed in the housing 11, the rotor 16 is inserted into the housing 11, followed by the seal 25 which axially seals the rotor 16 adjacent to the second axial side. In the end, the housing 11 is closed by the lid 15. All of the aforementioned assemblies are inserted into said housing from the second axial side of the housing 11, on which the lid 15 is lastly mounted.

The electric machine 10 according to an embodiment of the invention is preferably a drive assembly of a hybrid vehicle or an electric vehicle.

In some embodiments, the invention further relates to a motor vehicle, namely a hybrid vehicle or an electric vehicle, which comprises the electric machine 10 described above as a drive assembly.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electric machine, comprising:
a housing;
a rotor which comprises a rotor shaft and a rotor laminated core;
a stator which comprises a stator laminated core, the stator being directly cooled by a coolant;
an annular gap configured between the rotor laminated core and the stator laminated core;
a sleeve-like wall element disposed in the annular gap, the wall element having a unitary body with a radially inner surface and a radially outer surface, the radially inner surface and radially outer surface being parallel to a radially outer surface of the rotor shaft and extending along an entire axial length of the wall element, wherein the radially outer surface of the wall element abuts the stator and the wall element seals the stator against the rotor such that none of the coolant reaches the rotor via the annular gap from the stator; and
a support ring,
wherein the housing is configured in a pot-like manner such that it is permanently or tightly closed on a first axial side by a bottom wall at least radially overlapping the stator and is open on an opposite second axial side configured to be closed at the second axial side via a lid,
wherein seals are disposed at each axial end of the wall element, each seal being disposed against a radially inner surface of the support ring,
wherein the wall element is supported by the support ring on the radially outer surface at both axial ends or both axial sides of the wall element,
wherein the support ring surrounds the wall element at both axial ends of the wall element, the support ring having a projection disposed adjacent to the first axial side of the housing such that the projection of the support ring has a smaller inner diameter than the wall element.

2. The electric machine according to claim 1, wherein the seal that is disposed adjacent to the first axial side of the housing seals against the projection of the support ring.

3. The electric machine according to claim 2, wherein the seal that is disposed adjacent to the second axial side of the housing seals against the support ring disposed on the second axial side of the housing.

4. The electric machine according to claim 3, wherein the support ring has a further projection disposed adjacent to the second axial side of the housing, and the seal that is disposed adjacent to the second axial side of the housing seals against the further projection of the support ring.

5. The electric machine according to claim 4, wherein the projection and the further projection each extend radially from an outer radial side of the wall element toward an inner radial side of the wall element past a respective axial end of the wall element.

6. The electric machine according to claim 4, wherein the further projection has a smaller inner diameter than the wall element.

7. The electric machine according to claim 6, wherein the projection has a smaller inner diameter than the further projection.

8. The electric machine according to claim 1, wherein the electric machine is a drive assembly of a hybrid vehicle or an electric vehicle.

9. A hybrid vehicle or an electric vehicle, comprising an electric machine according to claim 1.

10. A method for assembling a motor, the method comprising:
providing a housing configured in a pot-like manner such that it is permanently or tightly closed on a first axial side by a bottom wall at least radially overlapping the stator and is open on an opposite second axial side configured to be closed at the second axial side via a lid;
inserting a rotor with a rotor shaft and a rotor laminated core, a stator with a stator laminated core, and a support ring in the housing through the second axial side such that an annular gap is arranged between the rotor laminated core and the stator laminated core;
arranging a sleeve-like wall element in the annular gap, the wall element having a unitary body with a radially inner surface and a radially outer surface, the radially inner surface and radially outer surface being parallel to a radially outer surface of the rotor shaft and extending along an entire axial length of the wall element;
arranging seals at each axial end of the wall element, each seal being disposed against a radially inner surface of the support ring, wherein the support ring surrounds the wall element at both axial ends of the wall element, the support ring having a projection disposed adjacent to the first axial side of the housing such that the projection of the support ring has a smaller inner diameter than the wall element;
closing the housing by attaching the lid to the housing at the second axial side; and
directly cooling the stator with a coolant, wherein the radially outer surface of the wall element abuts the stator and the wall element seals the stator against the rotor such that none of the coolant reaches the rotor via the annular gap from the stator.

11. The method according to claim 10, wherein the stator and the sleeve-like wall element are inserted into the housing before a first seal of the seals is arranged at the first axial side of the housing, the first seal being inserted through the second axial side of the housing.

12. The method according to claim 11, wherein an outer radius of the first seal is smaller than an inner radius of the inner surface of the wall element.

13. The method according to claim 11, wherein the rotor is inserted into the housing after the first seal, and wherein a second seal of the seals is inserted into the second axial side of the housing and arranged at the second axial side of the housing after the rotor is inserted into the housing.

* * * * *